Aug. 7, 1951 W. M. HYNES 2,562,918
AIRCRAFT CABIN AIR CONDITIONING SYSTEM
AND CONTROL VALVE THEREFOR
Filed Feb. 9, 1949 4 Sheets-Sheet 1

INVENTOR.
WILLIAM M. HYNES
BY Wade Krout AND
ATTORNEY
Charles L. Burgoyne,
AGENT

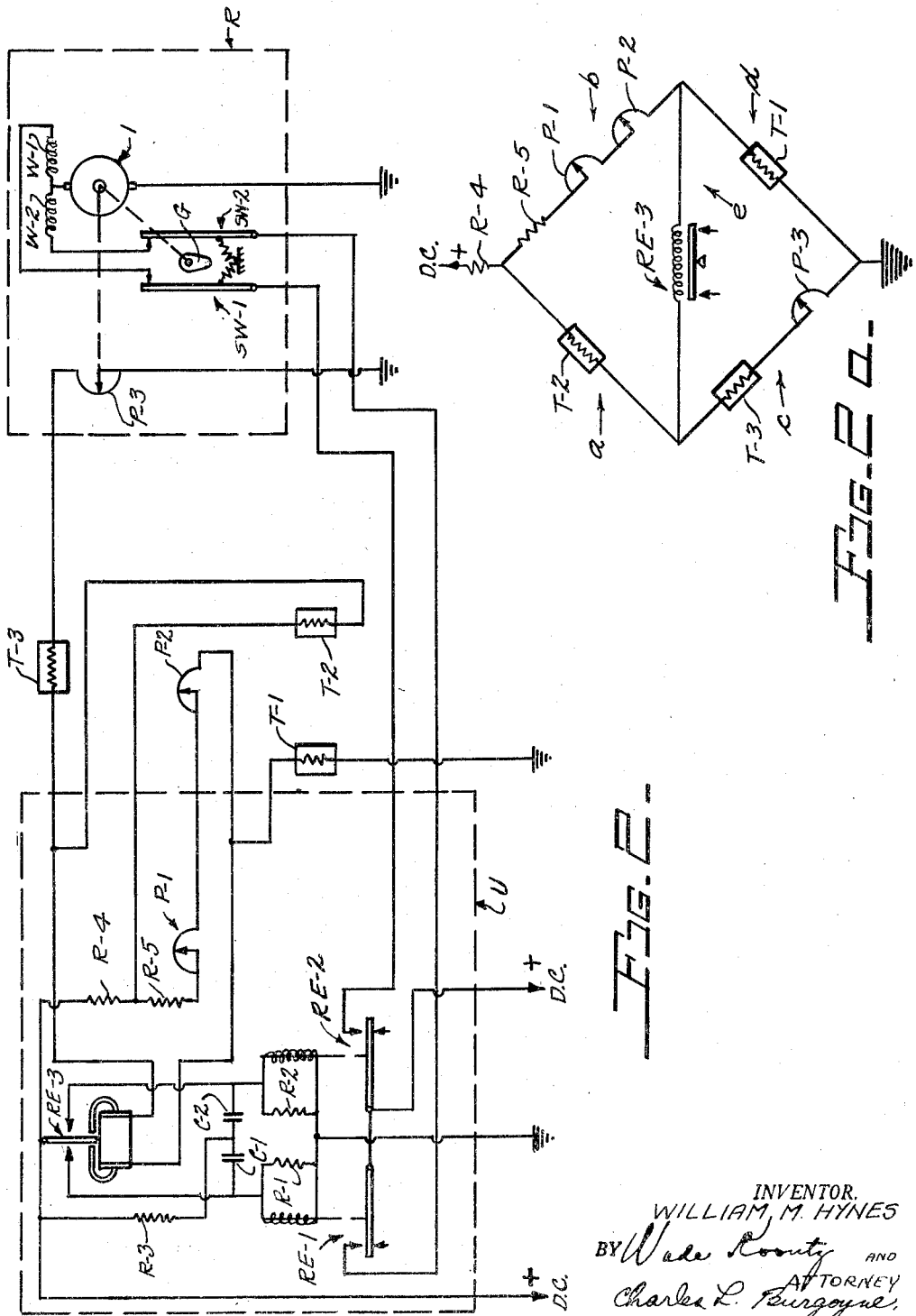

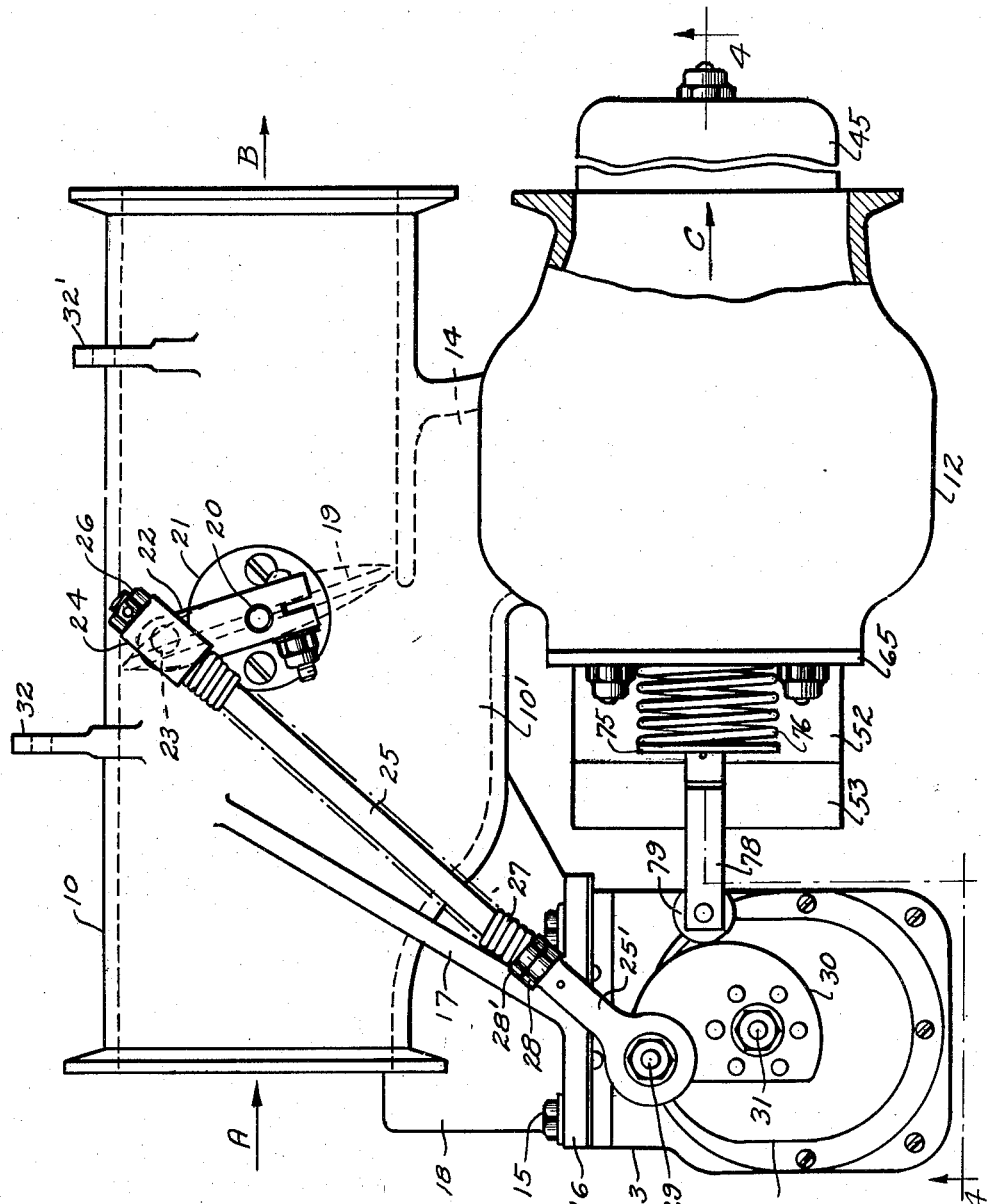

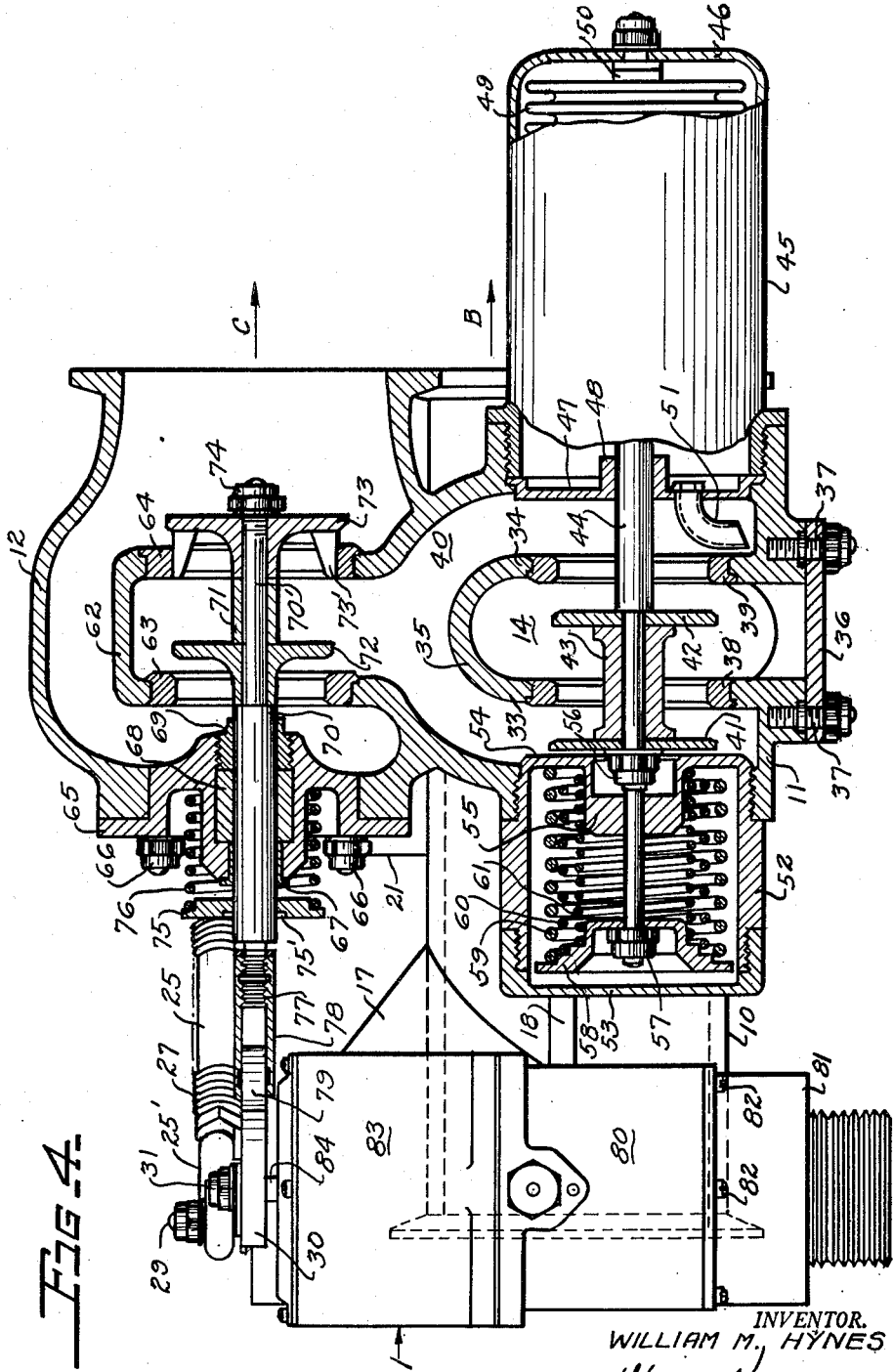

Patented Aug. 7, 1951

2,562,918

UNITED STATES PATENT OFFICE 2,562,918

AIRCRAFT CABIN AIR CONDITIONING SYSTEM AND CONTROL VALVE THEREFOR

William M. Hynes, La Grange, Ill.

Application February 9, 1949, Serial No. 75,461

9 Claims. (Cl. 98—1.5)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an air conditioning system for aircraft and to a flow control valve forming a necessary part of the system.

The primary object of the invention is to provide a system and apparatus for use in pressurizing and air conditioning aircraft cabins in which temperature responsive control means is adapted to effect close control over the air temperature within the cabin and simultaneously maintain sufficient flow of fresh air to maintain a minimum air pressure in the cabin.

A further object of the invention is to provide a system for pressurizing and air conditioning the cabins of jet propelled aircraft and to make use of the flow of high pressure air from the engine air compressor to heat the cabin, or to cool the cabin after passing some of the air through a cooling unit, and to simultaneously supply enough air to the cabin to make up for leakage to the outside in rarefied atmosphere.

Another object of the invention is to provide an air conditioning system for an aircraft carrying an air compressor and to incorporate in said system a flow control valve to proportion the relative amounts of heating and cooling air passed into the aircraft cabin so as to maintain a cabin air temperature conducive to comfort.

Another object of the invention is to provide an air conditioning system for an aircraft carrying an air compressor and to incorporate in said system a flow control valve having separate valves for the cold side and hot side of the air conditioning system and to provide a common actuating mechanism for the separate valves so arranged that for minimum open positions of either valve the other valve will also be partly open in order to maintain a minimum rate of air flow at all times for effective cabin pressurizing.

Another object of the invention is to provide an air conditioning system for aircraft of the jet propelled type including an air compressor directly coupled to the jet power plant wherein a portion of the compressed air from said compressor is used to air condition the aircraft cabin and wherein there is a flow control valve including a hot air control using two valves in series, with the first valve being responsive to air pressure on one side thereof to regulate the flow of hot air therethrough and maintain a constant pressure on the one side of the first valve in order to maintain a constant inlet pressure on the second valve and thus permit accurate control over the flow of hot air by the second valve.

Another object of the invention is to provide a completely automatic air conditioning and cabin pressurizing system for jet propelled aircraft, including flow control means adapted to make economical use of the compressed air diverted from the air compressor of the jet power plant.

Another object of the invention is to provide an automatic air conditioning and cabin pressurizing system for aircraft cabins and to provide a control valve for the system giving an improved coordination between the air flow along the hot side and cold side of the system.

Another object of the invention is to provide an improved valve for use in an air conditioning system and including a coordinated action for control of air flow along the hot side and cold side of the system.

The above and other objects of the invention will become apparent upon reading the following detailed description in conjunction with the drawings, in which:

Fig. 1a is a graphical representation of the valve action of the present system to illustrate the overlap relation of the valves in the hot side and cold side of the system.

Fig. 2 is a wiring diagram of the electrical control circuit which is suggested for use in the present air conditioning system.

Fig. 2a is a wiring diagram of the bridge circuit forming part of the complete circuit of Fig. 2.

Fig. 3 is a top plan view of the flow control valve forming a necessary and vital part of the present air conditioning system.

Fig. 4 is a cross sectional view taken on line 4—4 of Fig. 3.

In modern jet propelled aircraft the speeds have reached and passed the 500 mile an hour range and it has been found that cooling of the cabin is imperative because friction between the aircraft and the air causes heating of the aircraft skin. Other heating loads, such as electrical equipment in the cabin and sun load on clear days, must be reckoned with also. In cold climates and also at high altitudes cabin heating may be required instead of cooling and in addition high altitude requires cabin pressurization to maintain comfort and oxygen requirements.

Thus a complete cabin air conditioning system should have provision for supplying outside air to the cabin in proper quantities for cabin pressurizing when needed and the air should be supplied at the proper temperature to maintain good comfort conditions in the cabin. Furthermore the control of the air conditioning system should be completely automatic in order to relieve the pilot or other personnel of unnecessary duties. Heating of the cabin is usually a simple matter but cooling is not so easily accomplished. It is usually considered desirable to maintain cabin temperature below 90° Fahrenheit but this temperature is often exceeded in practice.

*Air conditioning and pressurizing system*

Figure 1:
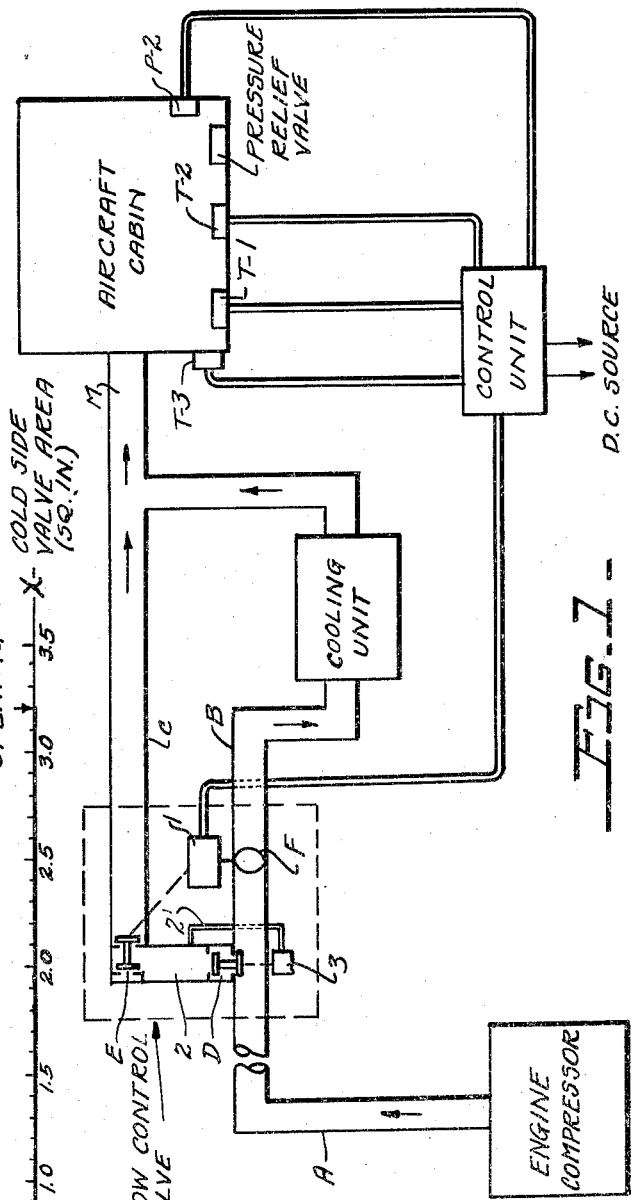
Fig. 1 is a schematic diagram of the present air conditioning system as applied to an aircraft having an engine driven air compressor and including a closed cabin to be heated, cooled and pressurized.
Figure 10:
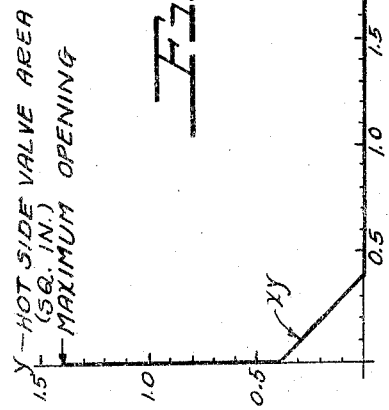

The present system of air conditioning is shown schematically in Fig. 1, wherein the engine compressor is usually the turbo-compressor directly coupled to the combustion turbine of the turbojet engine. Only a small part of the available compressed air is bled from the compressor to accomplish the cabin air conditioning and pressurizing, the major portion of the compressed air being used to support combustion in the jet engine and thus drive the combustion turbine thereof. The compressed air as bled from the engine compressor through the duct A may be at various pressures and temperatures depending on the compressor design, engine speed, aircraft speed and ambient air temperature. However as an example one well-known jet airplane will supply compressed air ranging from 10 to 120 pounds per square inch gage pressure and from 100 to 550 degrees Fahrenheit. The compressed air reaches the flow control valve through duct A, and the main function of this valve is to proportion the air flow to the outlet ducts B and C so as to result in the proper degree of cooling and heating of the aircraft cabin. The air path to the cabin by duct C provides a bypass around the air cooling unit and thus allows hot air to reach the cabin directly from the engine compressor. Air reaching the cabin through the duct B must pass through a cooling unit and such cooled air is mixed with any concurrent flow through duct C in the single duct M leading into the cabin. The cooling unit may take any of several different forms but the preferable type of air cooler or refrigerator operates on an air cycle and includes an expansion turbine adapted to extract energy from the incoming air and thus cause rapid cooling thereof. While this type of cooling unit in sizes suitable for carrying on an aircraft is a recent development, a fairly complete description thereof may be found in "Aviation" for the month of February 1947, pages 49 to 52, the article being entitled "Air conditioning turbine-propelled aircraft" and the author being H. J. Wood. For the purpose of the present invention disclosure the cooling unit may be regarded as a heat transfer unit wherein air passed therethrough gives up a substantial part of its heat content and passes on as cold air to accomplish cooling of the cabin.

All air entering the cabin by way of the mixing duct M aids in maintaining a desirable cabin air pressure but in the event that the aircraft is at low levels the cabin pressure might become too high. For this reason and also to prevent too large a pressure difference between inside and outside pressure at high altitudes, the cabin wall is provided at one point with an automatic pressure relief valve or safety valve. These valves are well-known, one example being that shown in the patent to Cruzan No. 2,451,278. One important function of the pressure relief valve is to prevent undue stress on the aircraft walls tending to burst the cabin open. In a typical fighter aircraft the pressure relief valve is set to open when the cabin pressure exceeds the outside air pressure by more than six inches of mercury. The automatic operating means for the valve is arranged to be responsive to the pressure difference between the cabin interior and the outside air. In addition it should be noted that there will be constant leakage through various crevices and joints as long as the inside pressure is more than the outside pressure. This loss is unavoidable, although it should be kept at a minimum so that the amount of compressed air necessary for the air conditioning system may be held to a necessary minimum. The flow control valve is responsive to temperature conditions in the cabin and also outside air temperature to regulate the relative amounts of cold and warm air fed into the cabin. To effect this control various arrangements are possible but the one chosen for illustration includes two temperature sensitive resistors, or thermistors, in the cabin as at T—1 and T—2. These elements are preferably placed on or close to the pressure relief valve where they are affected by the temperature of the air near its point of exit from the cabin or cockpit. In addition an outside compensating element or thermistor T—3 is located in the outside atmosphere, preferably in the compressor air intake, where changes in the temperature of the atmosphere will affect the resistance of the element. The thermistors T—1, T—2 and T—3 are connected into a bridge circuit as represented in Fig. 1 by the control unit, the circuit effecting operation of the servomotor 1 to control the proper proportioning of warm and cold air to the cabin. The circuit by which this is accomplished will be described below, including also a pilot's temperature control potentiometer P—2 which is manually adjustable to suit individual comfort or climatic variations.

The flow control valve which is the "heart" of the present air conditioning and pressurizing system includes a valve D opening from the duct A into the interim pressure chamber 2 and controlled by a bellows or other pressure responsive device 3 connected to the chamber 2 by a tube 2'. This valve may be termed a mass flow control valve, since by virtue of its actuating means and positioning in the valve assembly it functions to prevent increased flow of warm air to the cabin with increased power setting or increased aircraft speed. This valve also makes it possible to maintain control over cabin pressure by temperature responsive means alone, such as thermistors T—1 and T—2 and the circuit controlled thereby. The valve assembly also includes valve E governing hot side air flow (duct C) and valve F governing cold side air flow (duct B). These two valves are interconnected mechanically and positioned by the servomotor 1. The interlinking is of such a character as to cause an overlap during part of the travel of each valve. This overlap is designed to assure pressurizing air flow at load points when thermal requirements dictate lower flows than actually are required to overcome or counteract cabin air leakage. Obviously the minimum valve overlap consistent with the necessary pressurizing flow is desirable in order to avoid wasting engine compressor air. By overlap is meant the opening of one valve at least to some extent before complete closing of the other valve, so that there will always be at least a minimum air flow into the aircraft cabin. The means for obtaining the overlap function in a typical flow control valve as well as the details of the valve itself will be described below. The valve overlap may be shown graphically by a simple diagram as in Fig. 1a, wherein the ordinate axis (y) is graduated in terms of effective valve area at the hot side valve E and the abscissa axis (x) is graduated in terms of effective area at the cold side valve F. Assuming for illustration that the cold side valve F is wide open, it will be seen that the effective area is 3.2 square inches and that the hot side valve area is now zero. Following the x axis to the left it will be seen that the cold side opening is reduced until it reaches 0.4 of a square inch. Now by following the line xy upwardly it will be seen that the cold side valve F is still closing but at the same time the hot side valve E is opening. At a hot side valve opening of 0.4 of a square inch the cold side valve will be completely closed but further operation of the valve servomotor I in the same direction will further open the hot side valve E until a maximum opening of 1.4 square inches is reached. These characteristics for the example here given may be seen at any point along the heavy line formed by portions of the x and y axes and by the sloping line xy. This diagram (Fig. 1a) represents only one possible valve design and was arrived at after calculation of many factors, such as cabin leakage, cooling load under extreme conditions, heating load under extreme conditions, air pressure and temperature available for the system and determination of pressure drops to be expected at various parts of the system. Other satisfactory solutions may be made but for one particular installation the diagram of Fig. 1a represents a practical design for a single engine aircraft. The valve areas stated are the effective valve areas, which are the actual areas multiplied by a coefficient depending on the type of valve. By reading to the left and downwardly from any point on the sloping line xy it is possible to determine quickly the valve areas for the hot side and cold side for any point in the valve overlap range. The valves D and E in the hot side of the system are preferably of the poppet type in order to be substantially air tight when closed, while the cold side valve F may be a simple butterfly valve because it is desirable to allow air leakage in the closed position and thus keep the high speed expansion turbine in the cooling unit running. This turbine may rotate as high as 100,000 R. P. M. and if kept in operation it may accelerate much more quickly when there is a demand for cooling air. In fact if the turbine unit were suddenly accelerated from a dead stop there would probably be failure of bearings and other elements. To insure a flow on the cold side at all times regardless of the position of the valve F, it is preferable to drill a small hole in the damper element of the cold side valve F. Thus the expansion turbine in the cooling unit will always be turning over and will be more readily accelerated when the valve F is opened by action of the electric servomotor I. Of course when the valve F is closed, most of the compressed air flowing from the engine compressor through duct A must pass through the poppet valves D and E and duct C, thus bypassing the cooling unit and giving a maximum cabin heating effect. For this reason the hot side of the system may also be termed the hot air bypass of the system. On the cold side the air flow is regulated by the valve F and also by the cooling unit, which has characteristics similar to an orifice whereby air flow is dependent on the pressure drop available across the unit.

*Valve control circuit*

The control unit of Fig. 1 is indicated at U in Fig. 2, while the portion of Fig. 2 indicated at R includes the servomotor I, two limit switches SW—1 and SW—2 and a follow-up potentiometer P—3. Also depicted in Fig. 2 are the similar cabin thermistors T—1 and T—2, the outside compensating thermistor T—3 and the pilot's temperature control potentiometer P—2. The purpose of these units and components is to provide automatic and accurate control of the cabin temperature by proper actuation of the valve controlling servomotor I. The motor I is a split-field reversible direct current motor including two field windings W—1 and W—2 connected together at one end and leading to ground through the armature. The other ends of the two windings extend to contacts on a pair of limit switches SW—1 and SW—2 adapted for actuation by a cam G driven from the motor I through a gear reduction. These limit switches stop the motor when the hot side and cold side valves reach their extreme open positions. For instance with the control system calling for more heat in the cabin, the winding W—2 will become active through action of the control circuit U. This will rotate the motor counterclockwise to cause the hot side valve to open and the cold side valve to close. If the system continues to call for more heat, the motor will continue to run until the hot side valve reaches maximum open position and the cam G opens the switch SW—2, thus breaking the power circuit to field winding W—2. Conversely if the control system calls for cold air, the field winding W—1 will become active through action of the control circuit U. The motor I will now run in a clockwise direction to open the cold side valve and close the hot side valve. If this action proceeds to an extreme open position for the cold side valve the cam G will open the limit switch SW—1 to break the circuit to field winding W—1. The motor I is also adapted to drive the follow-up potentiometer P—3 in such a direction as to rebalance the bridge circuit which governs the action of control unit U. This potentiometer is driven by the motor I through a gear reduction and thus acts to slowly cancel out the motor actuating signal of the bridge circuit by the time the motor has operated the flow control valve sufficiently to correct the cabin temperature. This follow-up action of the motor driven potentiometer P—3 stabilizes the present air conditioning system and prevents wide variations in cabin temperature due to over-control and "hunting." This follow-up device also prevents excessive operation of the servomotor I, to keep wear at a minimum.

The two similar and similarly positioned thermistors T—1 and T—2 sense cabin air temperature, preferably at the air escape or relief valve. These elements are resistors having a negative coefficient of resistance, that is their resistance increases as the temperature decreases. They may be wound resistors using wire of an aluminum alloy known as Ohmax or may be made of graphite rods which also have a pronounced negative coefficient of resistance. The outside air compensator T—3 is also a thermistor, or temperature responsive resistor, but this element has a positive temperature coefficient of resistance. Most metals have this characteristic, so that numerous possibilities exist for the resistance windings of thermistor T—3. For example these windings may be formed of iron wire, Phosphor bronze wire, nickel wire or German silver wire. The ouside air thermistor T—3 is preferably located in the air intake of the turbo-jet engine but other outside locations are possible. Its purpose is to sense changes in the atmospheric air temperature, so as to anticipate changes in the cooling load or the heating load and start the valve actuator running in the proper direction to counteract the change in fresh air temperature. This will give closer control over the cabin temperature and more economical operation of the whole system. As an example consider the aircraft at 3000 feet altitude and outside air at such a temperature that cabin cooling is needed. Now the cold side air path will be open by way of valve F, at least partly open anyway. Now if the aircraft is suddenly put in a steady climb to about 10,000 feet, the air temperature will fall an average of 5° Fahrenheit for each 1000 feet. Thus at 10,000 feet the air temperature may be quite low, say about 25° Fahrenheit. Now the thermistor T—3 will steadily respond to a cooler outside air temperature to unbalance the bridge circuit (Fig. 2a) in a direction to cause closing of the cold side air path and possibly some opening of the hot side air path. By the time the aircraft has reached 10,000 feet the flow control valve is already in a position to effect proper cabin air temperature, or nearly so. Any further adjustments will be effected by the bridge signals originating in thermistors T—1 and T—2. These two thermistors being similar in characteristics and being at the same location in the cabin, act together to effect similar bridge signals in opposite legs of the bridge circuit (see Fig. 2a).

The control unit U comprises two switching relays RE—1 and RE—2 to control the servomotor 1, and a polarized relay RE—3 which receives its actuating signal from the bridge circuit and by its response thereto effects operation of the two switching relays. When the polarized relay RE—3 closes to the left a power circuit through the relay contactor is completed to energize the switching relay RE—1. This latter relay then closes a circuit through limit switch SW—2 to the motor winding W—2 to connect the winding to the D. C. power and start the motor 1 running in one direction. However if the polarized relay RE—3 closes to the right the switching relay RE—2 is energized to complete a power circuit through switch SW—1 to the motor winding W—1, thus starting the motor to run in the other direction. In order to reduce arcing at the contact points of the polarized relay RE—3 a pair of condensers C—1 and C—2 are connected at one terminal to the respective relay contacts, and the other terminals are connected together and through a resistor R—3 are connected to the movable contactor of relay RE—3. Also a pair of resistors R—1 and R—2 are connected across the windings of switching relays RE—1 and RE—2 respectively for the purpose of absorbing some of the induced charge of these windings upon breaking of the contacts of the polarized relay. Thus some of this self-induced charge will be shorted through resistors R—1 and R—2 and the result will be almost negligible arcing at the contacts of relay RE—3. The resistor R—4 of control unit U may be about 150 ohms and is for the purpose of reducing the voltage on the bridge circuit, to be described below. The potentiometer P—1 (100 ohms) is merely a calibrating unit to be used in adjusting the bridge circuit in such a manner that the pilot's temperature control potentiometer P—2 of about 250 ohms value may indicate an approximate temperature range, for example from 65° to 85° Fahrenheit. As seen in Fig. 2a the potentiometers P—1 and P—2 are in the same leg of the bridge circuit. The resistor R—5 in this same leg of the bridge is of 100 ohms value and is needed to further increase the total resistance of this portion of the circuit. The servomotor follow-up potentiometer P—3 may be about 100 ohms in value and is connected in series with the outside air thermistor T—3 to form one leg of the bridge circuit.

The bridge circuit shown in Fig. 2a is part of the complete circuit of Fig. 2 and provides the means for energizing the polarized relay in such a manner that the bridge output flows in the relay winding in either of two opposite directions depending on the action of the temperature sensing resistors or thermistors. For convenience the bridge circuit may be considered as comprising five legs $a$, $b$, $c$, $d$ and $e$, the latter leg representing the relay coil to be energized by the bridge output. For the bridge to be in balance the total resistance of leg $a$ should equal that of leg $b$ and the resistance of leg $c$ should equal that of leg $d$. Now the two ends of leg $e$ will be connected to equi-potential points, and no current will flow in the winding of relay RE—3. However if the cabin temperature should now increase the resistance of legs $a$ and $d$ will decrease, causing more current to flow in legs $a$ and $d$ than in legs $b$ and $c$ respectively. Now current will flow in leg $e$ in one direction to actuate the relay contactor in one direction accordingly, and thus close a circuit to one of the switching relays RE—1 or RE—2. This will set in motion the servomotor 1 in such a direction as to cause the flow control valve to supply more cold air to the cabin. At the same time the follow-up potentiometer P—3 will be operated by the servomotor in such a direction as to decrease the resistance of bridge leg $c$, thus making the resistance of legs $c$ and $d$ equal eventually. Now the only source of bridge unbalance is the difference in resistance of legs $a$ and $b$ but this will be overcome as soon as the cabin air temperature has been pulled down to a pre-set level, and the resistance of leg $a$ is now equal to the resistance of leg $b$. Thus it may be seen that the two cabin thermistors work together to provide a double bridge unbalancing effect to give a more effective action on the polarized relay RE—3, but the bridge will not completely rebalance until the thermistor T—2 has been affected by the changed air temperature that the system is calling for. Of course the polarized relay will respond to currents of opposite direction of flow to move the relay contactor oppositely, this type of relay being well known and usually including a permanent magnet to provide a reference field.

*Flow control valve*

For a description of the flow control valve in its preferred form reference is made to Figs. 3 and 4. The valve body comprises the straight-through cold side section 10, the mass flow control section 11 for the hot side, the temperature responsive hot side section 12 and the servomotor section 13. The arrows A, B and C indicate points of connection for the ducts A, B and C as shown in Fig. 1 and also indicate the directions of air flow. Centrally of one side the valve section 10 is enlarged at 10' to provide a passage from the straight-through cold side section 10 into the mass flow control section 11, the passage itself being indicated in Figs. 3 and 4 at 14. The valve body sections 10, 11 and 12 are portions of a one-piece valve casting but the servomotor section 13 is secured to the valve body by screws 15 which pass through a plate-like support 16 on the valve body. The support 16 is supported and braced by a triangular gusset portion 17 and a main connecting plate portion 18.

Except for the side opening 14, the valve section 10 provides a straight-through passageway forming the so-called cold side of the valve. Just forwardly of the side opening 14 there is a butterfly damper or valve member 19 pivotally mounted along a mid-line axis as at 20. Pivots extend into the wall of valve section 10 in opposite directions and the top pivot extends upwardly through a circular boss 21 on the upper side of the valve section 10. The pivot carries an adjustable arm or lever 22 which is pivotally connected at 23 to a collar 24 mounted on a connecting rod 25 and normally abutting a nut 26 on the adjacent end of the rod. At the other end of the collar there is a long compression spring 27 which is carried on the rod 25 and extends to a pair of nuts 28 and 28' forming part of an adjustable connection between the rod and a head portion 25'. Thus the overall length of the rod 25 may be adjusted to adapt the valve for various installations. The rod head portion 25' is pivotally connected at 29 to a cam member 30 rotatable by means of the servomotor 1 about the vertical shaft 31. It might be further noted that the valve section 10 carries at least two mounting flanges 32 and 32' whereby the valve body may be secured to a part of the aircraft. As seen in Fig. 3 the valve member 19 is in closed position, so that most of the compressed air would thus be routed through the side opening 14 and along the hot side of the control valve. By rotating the valve member 19 counterclockwise (Fig. 3) the cold side of the valve would become open. Total displacement of the valve member 19 from the position of Fig. 3 to a wide open position will be through an angle of about 70°, as may be measured on the view.

Now to consider the hot side of the valve which is reached by way of the side opening 14, reference is made to Fig. 4. The opening 14 enters the valve body section 11 between opposite parallel walls 33 and 34 which are joined at the top by an arched wall 35 and at the bottom by a cover plate 36 secured in place by threaded studs 37. The walls 33 and 34 are provided with axially aligned valve seats 38 and 39, which open into the interim pressure chamber 40. This chamber which branches below the arched wall 35 extends upwardly to the interior of body section 12. Cooperating with the circular valve seats 38 and 39 are valve members 41 and 42 forming a balanced poppet valve. Between the valve members is a sleeve 43 which like the members 41 and 42 is fitted over a valve push rod 44 having three portions of different diameters to provide suitable shoulders to properly locate the poppet members 41 and 42. By using a double poppet valve or spool type valve the air pressure on one valve member is counterbalanced by the air pressure on the other member and the valve is more stable, especially at positions approaching closed position.

Means at the right hand and left hand ends of the rod 44 are adapted to actuate the rod in opposite directions. Secured to the body section 11 is a cylindrical housing 45 having an integral end wall 46 at the free end and having a separate end wall 47 where it threads into body section 11. The end wall 47 is centrally apertured to provide a push rod guide 48 for rod 44. The push rod 44 connects inside housing 45 with one end of an evacuated bellows 49 having the other end secured to the wall 46, as at 50. In the end wall 47 there is fixed a pressure inlet tube 51, so that the interim chamber pressure will prevail within the bellows housing 45, in order to effect a collapsing movement of the bellows on increase of the interim chamber pressure. The body section 11 also carries a second housing 52 of cylindrical form closed at the free end by a threaded cap 53 and having an integral end wall 54 extending inside the housing to provide a push rod guide 55. The push rod 44 carries a nut 56 to hold the valve members 41 and 42 and the sleeve 43 in fixed position on the rod. At its free end within the housing 52 the rod also carries a nut 57 to provide an abutment for a cup-shaped washer 58. The washer is formed with a series of concentric shoulders each serving as a seat for one of a series of coil springs 59, 60 and 61 bearing at the opposite end of housing 52 on the end wall 54. Thus it will be seen that the compression springs 59, 60 and 61 tend to resist closing movement of the valve members 41 and 42, while the bellows 49 acts to partly close the valve when the interim chamber pressure rises. This valve 41, 42 which is responsive to interim chamber pressure on the hot side of the flow control valve acts to regulate mass air flow on a heating cycle to prevent over-pressurization on increase of engine power or increase in pressure of the compressor bleed air. Thus the mass flow control valve helps to prevent wasting engine compressor air by closing on increase of the interim chamber pressure. While the valve may not necessarily close completely when the compressor is speeded up, it will close sufficiently to maintain interim chamber pressure more or less constant. The mass flow control valve 41, 42 acts as an automatic metering device so that there will not be sudden and severe variations in the air pressure at the inlet side of the hot air regulating valve at the upper end of interim pressure chamber 40. This will enable the latter valve, corresponding to valve E of Fig. 1, to effect more reliable control over the flow of hot air into the duct C in response to action of the thermostats and the servomotor 1.

The hot side regulating valve is enclosed within the valve body section 12 and comprises an upward extension of the walls forming interim pressure chamber 40. These spaced parallel walls are joined at the upper end by a top wall 62, while the parallel walls therebelow are provided with concentric valve seats 63 and 64. The left hand end of the body section 12 is closed by a combined cover plate and valve guide 65 secured in place by means of studs 66. A central bore in the plate 65 accommodates a bushing 67, a quantity of packing 68 and a gland nut 69. Through these elements there is movably mounted a valve stem 70, having a reduced end portion 70'. The reduced portion provides at the left hand end thereof a shoulder against which is seated a poppet valve member 72 followed by a spacer 71, a second poppet valve member 73 and a securing nut 74. Near the periphery of valve member 73 there are provided several guide fingers 73' having a sliding fit within the valve seat 64 and acting to slidably support the free end of the valve stem. The double poppet valve structure acts to balance the air pressures acting on the valve and prevent chattering or erratic valve action, especially at high rates of air flow. Outside of the valve body section 12, the valve stem 70 is provided with a disk 75 which serves as a seat for a coil spring 76 tending to close the valve 72, 73 when thrust is removed from the stem 70. In order to retain the disk 75 in place on the rod or stem 70 there is a cross-pin 75' which is made secure by allowing it to seat in a shallow recess formed in the side of the disk away from the spring 76. The stem 70 includes a threaded section 77 adjustably secured in a tubular roller carrier 78, which has a roller 79 rotatably mounted on the free end thereof. The roller 79 is in continuous contact with the cam 30 driven by the electric servomotor 1. As seen in Fig. 3 the cam 30 is more or less semicircular in plan but is of increasing radius in a counterclockwise direction. The flat side of the cam corresponds to a closed position of valve 72, 73 while the rounded side may effect various degrees of opening movement for the valve 72, 73.

The servomotor 1 includes a small reversible electric motor 80 having a cable connector section 81 at the lower end secured to the motor housing by screws 82. Secured on top of the motor itself is a gear reduction section 83, containing a train of gears for reducing the motor speed to the cam shaft 84 so that many revolutions of the motor armature will be required to produce a single revolution of the cam shaft 84. The exact speed ratio between the motor and the cam shaft is not critical but may be 200 to 1 if desired. The ratio chosen also depends on the speed of the motor used in the assembly. The power supplied to the motor depends on what is available but for most aircraft installations the motor may be operated on 24 volts D. C. derived from the storage batteries. The gear reduction section of the servomotor structure may also include the motor follow-up potentiometer P—3 and the two limit switches SW—1 and SW—2 previously described.

*Summary of operation*

The present air conditioning and pressurizing system for aircraft cabins includes an engine driven air compressor for supplying air at elevated pressure and temperature. The air, which is only a minor part of the total compressor output, is conducted to a flow control valve having two air paths therethrough, each path being under control of a separate regulating valve included in the flow control valve. As explained above the valve 19 controls air flow along a cold air path into the cabin, while the valve 72, 73 controls air flow along a hot air path into the cabin. These same valves are designated F and E in Fig. 1. Also the valve 41, 42 (valve D in Fig. 1) maintains a constant inlet pressure at the hot air regulating valve, so that the volume of hot air flowing to the cabin is determined solely by the positioning of the hot air regulating valve 72, 73. This valve 72, 73 thus provides a regulator having linear characteristics regardless of changing compressor output or changing pressure upstream of the hot air valve. As may be seen in Fig. 4, the valve 41, 42 is maintained in positional equilibrium by means of compression springs 59, 60 and 61 tending to pull the rod 44 to the left and the interm chamber pressure acting through tube 51 tending to collapse the bellows 49. The springs act to extend the evacuated bellows but the pressure in chamber 40 acting on the bellows tends to collapse the same. The balance between these opposing forces thus tends to position this mass flow control valve 41, 42 in such a way as to throttle the air flow into chamber 40 when the air pressure at valve inlet A rises and thus tends to maintain a constant inlet pressure on the hot air regulating valve 72, 73. Regulation of mass flow on the cold side of the system is not as critical as on the hot side, one reason being that increased engine and compressor output results in greater aircraft speed and the need for increased flow of cold air to cool the cabin. Moreover the air cycle employed for the cooling path with its expansion turbine and other impeding elements constitutes a limiting factor on the output of cold air.

The coordinated action of the hot side valve 72, 73 and the cold side valve 19 is effected by a common servomotor 1. The control circuit for the servomotor has been explained in detail above. However the action of the servomotor in providing an overlap effect for the valves should be mentioned. The servomotor operates the cam 30 through reduction gearing and as seen in Fig. 3 the rod 25 is pivoted to the cam at 29. The valve 19 is now closed and valve 72, 73 is partly open (see Fig. 4). If the cam 30 is now rotated in a counterclockwise direction (Fig. 3) the rod 70 associated with valve 72, 73 moves to the left under the action of spring 76, thus moving the hot side valve toward closed position. At the same time the rod 25 rotates the valve 19 in a counterclockwise direction to open the same. This opening movement of valve 19 is thus under way during the final closing movement of valve 72, 73. The instant positions of Fig. 3 will correspond in Fig. 1a to the intersection of line $xy$ with the $y$ axis. Now assuming that the cam 30 is rotated in a clockwise direction, the hot side valve 72, 73 will open toward its maximum open state while movement of the rod 25 toward a position of alignment with cam shaft 31 will merely compress the spring 27 as the rod slides through the collar 24. Similarly, when the hot side valve 72, 73 reaches closed position and the cam 30 continues rotating counterclockwise the roller 79 will merely fail to contact the cam 30 along the flat side thereof as the cold side valve 19 continues moving toward maximum open position. The link and lever connecting means between the crank pin 29 and the butterfly valve 19 and the cam and push rod connection between the servomotor and the poppet valve 72, 73 each provides what may be termed a lost motion actuating connection between the servomotor and the respective valves 19 and 72, 73. For effecting proper adjustment of the two regulating valves the respective actuating rods include means previously described for varying the effective length thereof. Also the actuating arm 22 for valve 19 is adjustably clamped to the valve pivot 20, as shown in Fig. 3. It is understood that valve 19 has a hole therethrough for allowing some air leakage in the closed position, in order to maintain the expansion turbine of the cooling unit in a state of continuous operation for reasons previously explained.

The cam and push rod actuating arrangement for the hot side and cold side regulating valves represents one possible and preferred valve correlating means and as may be seen from the above description results in the desired overlap of the valves to provide a guarantee of minimum air flow for pressurization of the cabin. Since pressurization must be dependent on the amount of air leakage from the cabin and since air leakage at high altitudes is greatest, the overlap characteristics of the valves for any installation should be worked out on the basis of maximum altitude conditions to be expected in normal operation of the aircraft. If the pressurization flow from the system is enough in the high altitude condition, then operation of the valve in the overlap range (line $xy$ of Fig. 1a) will also be satisfactory at the lower altitudes. It is further emphasized that the arrangement of the system and the valve controlling the two-path air flow through the system is such that complete control is accomplished on the basis of temperature demand alone. Adequate pressurization flow is provided automatically but without waste of any air from the engine air compressor. No pressure-responsive piloting or actuating device is required to maintain pressurizing air flow.

In closing, the most important features and advantages of the present air conditioning system are herewith enumerated as follows:

(1) The use of a thermostatically controlled valve device to proportion air flow through and air flow by-passing the air cooling unit;

(2) The overlap relation of the hot side and cold side air regulating valves to maintain cabin pressurizing air flow at load points when thermal requirements indicate lower flows than actually are required to offset cabin leakage;

(3) Maintenance of cabin pressurizing requirements on the basis of temperature demand alone;

(4) The mass flow control valve in the hot side air path to maintain a constant inlet air pressure on the hot side air regulating valve;

(5) Comparative simplicity, compactness and light weight of the complete system.

The embodiments of the invention herein shown and described are to be regarded as illustrative only and it is to be understood that the invention is susceptible to variations, modifications and changes within the scope of the appended claims.

I claim:

1. A flow control valve for use in a cabin air conditioning and pressurizing system for aircraft comprising, a hollow valve body provided with an air inlet opening and two air outlet openings, means providing a straight-through air passage from said air inlet opening to the first air outlet opening, means providing a side opening in said straight-through passage extending through said valve body to said second air outlet opening, a first valve means movably mounted adjacent to said second air outlet opening, a second valve means movably mounted adjacent to said first air outlet opening, a third valve means movably mounted between said side opening and said first valve means, a servomotor secured to said valve body, actuating linkages connecting said servomotor and said first and second valve means to provide simultaneous actuation thereof in response to operation of said servomotor and adapted to correlate the action of said first and second valve means in a manner to initiate opening of either valve means before the other valve means has reached closed position, a spring tending to maintain said third valve means in open position, and fluid pressure responsive means subject to the air pressure in the chamber between said first and third valve means tending to close said third valve means on increase of pressure in said chamber.

2. A flow control valve for use in a cabin air conditioning and pressurizing system for aircraft comprising, a hollow valve body provided with an air inlet opening for connection to a source of air at elevated pressure and temperature and also provided with two air outlet openings for connection to a cold air path including an air cooling unit and to a hot air path bypassing said air cooling unit, means providing a straight-through air passage from said air inlet opening to the first air outlet opening, means providing a side opening in said straight-through passage extending through said valve body to the second air outlet opening, a poppet valve movably mounted adjacent to said second air outlet opening, a butterfly valve movably mounted adjacent to said first air outlet opening, a servomotor secured to said valve body, actuating linkages connecting said servomotor and said poppet valve and butterfly valve to provide simultaneous actuation thereof in response to operation of said servomotor and adapted to correlate the action of said valves in a manner to initiate opening of either valve before the other valve has reached closed position, in order to maintain a minimal air flow through said valve body for pressurizing the cabin.

3. A flow control valve for use in a cabin air conditioning and pressurizing system for aircraft comprising, a hollow valve body provided with an air inlet opening for connection to a source of air at elevated pressure and temperature and also provided with two air outlet openings for connection to a cold air path including an air cooling unit and a hot air path bypassing said air cooling unit, means providing a straight-through air passage from said air inlet opening to the first air outlet opening, means providing a side opening in said straight-through passage extending through said valve body to the second air outlet opening, a poppet valve movably mounted adjacent to said second air outlet opening, a butterfly valve movably mounted adjacent to said first air outlet opening, a reversible servomotor secured to said valve body, an actuating connection between said servomotor and said poppet valve for moving said poppet valve gradually from open to closed position on operation of said servomotor through a predetermined range in one direction, an actuating connection between said servomotor and said butterfly valve for moving said butterfly valve gradually from open to closed position on operation of said servomotor through a predetermined range in the other direction, and said actuating connections providing an overlap of said predetermined ranges of operation of said servomotor during which both valves are partly open in order to insure a minimal air flow for pressurizing the aircraft cabin.

4. A flow control valve as recited in claim 3 including a valve means having a movably mounted valve member between said side opening and said poppet valve, a spring tending to maintain said valve member in the open position, and fluid pressure responsive means subject to the air pressure in the chamber between said poppet valve and said valve member tending to close said valve member on increase of pressure in said chamber.

5. A flow control valve for use in a cabin air conditioning and pressurizing system for aircraft comprising, a hollow valve body provided with an air inlet opening for connection to a source of air at elevated pressure and temperature and also provided with two air outlet openings for connection to a cold air path including an air cooling unit and to a hot air path bypassing said air cooling unit, means providing a straight-through air passage from said air inlet opening to the first air outlet opening, means providing a side opening in said straight-through passage extending through said valve body to the second air outlet opening, a poppet valve movably mounted adjacent to said second air outlet opening, a butterfly valve movably mounted adjacent to said first air outlet opening, a reversible servomotor secured to said valve body, a cam operated by said servomotor and having a cam face for operative engagement by a cam follower connected to said poppet valve, spring means tending to close said poppet valve and maintaining said cam follower in engagement with said cam face until the contour thereof allows said poppet valve to reach closed position, a crank pin mounted on said cam, a link and lever connection between said crank pin and said butterfly valve including lost motion means between said link and lever, the positioning of said crank pin and the contour of said cam face being such as to provide for one direction of cam rotation a first range of cam movement during which said poppet valve is moved from full open position toward closed position while said butterfly valve remains closed, a second range of cam movement during which said poppet valve is further moved toward closed position while said butterfly valve is moved toward open position, and a third range of cam movement during which said butterfly valve is moved to full open position while said poppet valve remains closed.

6. A flow control valve for use in a cabin air conditioning and pressurizing system for aircraft comprising, a hollow valve body provided with an air inlet opening and two air outlet openings, means providing a first passage from said air inlet opening to the first air outlet opening, means providing a second passage extending through said valve body from said first passage to said second air outlet opening, a first valve means movably mounted adjacent to said second air outlet opening, a second valve means movably mounted adjacent to said first air outlet opening, a reversible servomotor secured to said valve body, a lost motion actuating connection between said servomotor and said first valve means for moving said first valve means gradually from open to closed position on operation of said servomotor through a predetermined range in one direction, a lost motion actuating connection between said servomotor and said second valve means for moving said second valve means gradually from open to closed position on operation of said servomotor through a predetermined range in the other direction, said actuating connections providing an overlap of said predetermined ranges of operation of said servomotor during which both valve means are partly open in order to insure a minimal air flow for pressurizing the aircraft cabin, and the lost motion in said actuating connections providing free movement of either valve means toward full open position after complete closing of the other valve means.

7. A flow control valve as recited in claim 6 including a third valve means having a movably mounted valve member located in said second passage, a spring tending to maintain said valve member in the open position, and fluid pressure responsive means subject to the air pressure in the portion of said second passage between said first and third valve means tending to close said movably mounted valve member on increase of pressure in said portion of said second passage.

8. A cabin air conditioning and pressurizing system for aircraft comprising, an air compressor for providing a source of air at elevated pressure and temperature, means connected to said source of air to subdivide said air for passage toward the cabin along a hot air conduit and a cold air conduit, an air cooling unit interposed in said cold air conduit to cool the air flowing from said source of air through said cold air conduit toward the cabin, means to mix the air traversing said hot air conduit and said cold air conduit before the combined flow enters the cabin, a first valve means to determine the rate of air flow along said hot air conduit, a second valve means to determine the rate of air flow along said cold air conduit, a reversible servomotor for actuating said first and second valve means, a lost motion actuating connection between said servomotor and said first valve means for gradually closing said first valve means on operation of said servomotor through a predetermined range in one direction, a lost motion actuating connection between said servomotor and said second valve means for gradually closing said second valve means on operation of said servomotor through a predetermined range in the other direction, said actuating connections providing an overlap of said predetermined ranges of operation of said servomotor during which both valve means are partly open in order to insure a minimal air flow for pressurizing the aircraft cabin and the lost motion in said actuating connections providing free movement of either valve means toward full open position after complete closing of the other valve means.

9. A cabin air conditioning and pressurizing system for aircraft as recited in claim 8 and further comprising a third valve means having a movably mounted valve member located in said hot air conduit between said means to subdivide said air and said first valve means, a spring tending to maintain said valve member in the open position, and fluid pressure responsive means subject to the air pressure in the portion of said hot air conduit between said first and third valve means tending to close said movably mounted valve member on increase of pressure in said portion of said hot air conduit.

WILLIAM M. HYNES.

REFERENCES CITED

The following references are of record in the file of this patent:

UNITED STATES PATENTS

| Number | Name | Date |
|---|---|---|
| 2,194,749 | Gregg | Mar. 26, 1940 |
| 2,350,896 | Jde | June 6, 1944 |
| 2,401,861 | Cunningham | June 11, 1946 |
| 2,474,441 | Sparrow | June 28, 1949 |